United States Patent Office 3,455,946
Patented July 15, 1969

3,455,946
5-(ORTHO-ALKENYLOXYPHENOXYMETHYL)-OXAZOLIDINONE-2-COMPOUNDS
Max Wilhelm, Allschwil, Switzerland, Hans Ulrich Daeniker, Clifton, N.J., and Karl Schenker, Binningen, and Paul Schmidt, Therwil, Switzerland, assignors to Ciba Corporation, New York, N.Y., a corporation of Delaware
No Drawing. Filed June 1, 1966, Ser. No. 554,317
Claims priority, application Switzerland, July 9, 1965, 9,629/65; Nov. 17, 1965, 15,855/65; Apr. 6, 1966, 5,059/66
Int. Cl. C07d 85/28; A61k 27/00
U.S. Cl. 260—307  3 Claims

ABSTRACT OF THE DISCLOSURE

Compounds of the formula

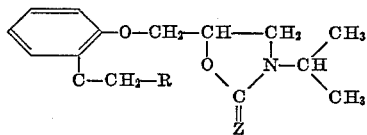

where Z represents an oxygen or sulfur atom and R represents a lower alkenyl radical which contains at least 2 and preferably no more than 4 carbon atoms. The compounds are adrenergic β-receptor inhibitors and are also useful as intermediates.

---

The present invention relates to new heterocyclic compounds. Especially it concerns compounds of the formula

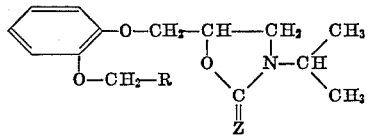

where Z represents an oxygen or sulfur atom and R represents a lower alkenyl radical which contains at least 2 and preferably no more than 4 carbon atoms.

The residue R is preferably the vinyl radical or a propenyl or butenyl radical.

The new compounds posses valuable pharmacological properties. Inter alia, they inhibit more especially adrenergic β-receptors, as can be demonstrated in animal tests, for example on cats and isolated guinea pig hearts. The new compounds may therefore be used in treating angina pectoris and a disturbed heart rhythm. The new compounds are also valuable intermediates for use in the manufacture of other useful substances, especially of pharmacologically active substances.

Particularly valuable pharmacological properties are found in compounds of the formula

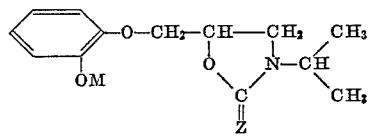

in which M stands for the allyl or methallyl residue and Z represents O or S, and above all in 3-isopropyl-5-(ortho-allyloxy-phenoxymethyl)-oxazolidinone-2 of the formula in which M stands for the allyl or methallyl residue and Z represents O or S, and above all in 3-isopropyl-5-(ortho-allyloxy-phenoxymethyl)-oxazolidinone-2 of the formula

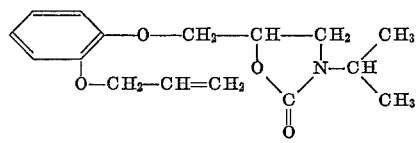

which, for example, when administered intravenously to cats in a dose of from 0.01 to 0.1 mg. per kg. of bodyweight, produces a distinct β-blocking action.

The new compounds are obtained by known methods. In a preferred process a compound of the formula

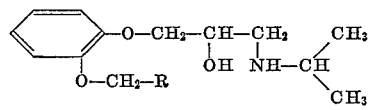

in which R has the meaning given above, is reacted with a carbonic or thiocarbonic acid dihalide or diester, above all with carbonic acid diethyl ester or with phosgene or thiophosgene.

The reaction is performed in the usual manner, preferably by heating, in the presence or absence of solvents, if desired or required in the presence of a condensing agent.

The starting materials are known or can be prepared by known methods.

The invention includes also any variant of the process in which an intermediate obtained at any stage of the process is used as starting material and any remaining step/steps is/are carried out or the process is discontinued at any stage thereof, or in which the starting materials are formed in situ or used in the form of their salts.

The new compounds may take the form of racemates or be in the form of the antipodes. The racemates can be resolved into the antipodes in the usual manner. It is advantageous to isolate the more active one of the antipodes.

The new compounds may be used, for example, in the form of pharmaceutical preparations which contain them in conjunction or admixture with organic or inorganic, solid or liquid pharmaceutical excipients suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, polyalkylene-glycols, white petroleum jelly or other known medicinal excipients. The pharmaceutical preparations may be, for example, tablets, dragées or capsules, or in liquid form solutions, suspensions or emulsions. They may be sterilized and/or may contain auxiliaries such as preserving, stabilizing, wetting or emulsifying agents, salts for regulating the osmotic pressure or buffers. They may also contain further therapeutically valuable substances. The pharmaceutical preparations are formulated by usual methods.

The following examples illustrate the invention.

Example 1

5.0 grams of finely powdered potassium carbonate are added to 13.0 g. of 1-isopropylamino-2-hydroxy-3-(ortho-allyloxy-phenoxy)-propane in 150 ml. of toluene, and 30 ml. of a solution of phosgene in toluene of 20% strength are stirred in dropwise at room temperature. After 6 hours the precipitate formed is filtered off, and the filtrate evaporated in a water-jet vacuum, to leave an oil which crystallizes slowly. On recrystallization from methylene chloride+petroleum ether 3 - isopropyl - 5-(ortho-allyloxy-phenoxymethyl)-ozazolidinone-(2) of the formula

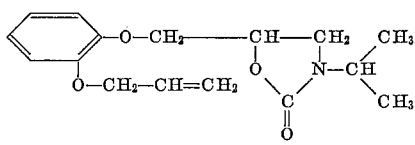

is obtained in the form of crystals melting at 58 to 60° C.

The starting material is obtained in the following manner:

A mixture of 75 g. of pyrocatechol monoallyl ether, 75 g. of epichlorohydrin, 75 g. of potassium carbonate and 400 ml. of acetone is stirred and heated at the boil for 12 hours. The potassium carbonate is then filtered off, and the solvent distilled off under a weter-jet vacuum, to leave an oil which is dissolved in ether and agitated with 2 N-sodium hydroxide solution. The ether is separated, dried and distilled off. The residue thus obtained is distilled under a water-jet vacuum. 3-(ortho-allyloxy-phenoxy)-1,2-epoxypropane passes over between 145 and 157° C. under 11 mm. Hg pressure.

A solution of 15 g. of 3-(ortho-allyloxy-phenoxy)-1,2-epoxypropane and 15 g. of isopropylamine in 20 ml. of ethane is refluxed for 4 hours. The excess amine and the alcohol are then distilled off under vacuum, to yield 1-isopropylamino-2-hydroxy-3-(ortho-allyloxy - phenoxy)-propane which melts at 75 to 80° C. after recrystallization from hexane.

Example 2

Tablets, each containing 20 mg. of active substance, are prepared from:

|  | Mg. |
|---|---|
| 3-isopropyl-5-(ortho-allyloxy-phenoxymethyl)-oxazolidinone-2 | 20 |
| Starch | 60 |
| Lactose | 50 |
| Colloidal silica | 5 |
| Talcum | 9 |
| Magnesium stearate | 1 |
| | 145 |

Example 3

For filling capsules a mixture is prepared from:

|  | G. |
|---|---|
| 3-isopropyl-5-(ortho-allyloxy-phenoxymethyl)-oxazolidinone-(2) | 2500 |
| Talcum | 80 |
| Colloidal silica | 20 |

The active substance is intimately mixed with talcum and colloidal silica, and the mixture is passed through a 0.5 mm.-mesh sieve and in portions of 21 mg. filled into hard gelatin capsules.

Example 4

The new compounds may be used in the form of pharmaceutical preparations containing them in conjunction with vasodilatory, especially coronarydilatory, compounds, especially vasodilatory esters of nitrous or nitric acid, above all nitroglycerin, pentaerythritol tetranitrate, triethanolamine trinitrate, nitromannitol, also theobromine, theophilline, hydroxyethyltheophilline, dihydroxypropyl theophilline and other coronarydilatory derivatives of theobromine and theophilline, as well as 2-ethyl-3-(3′,5′-diiodo-4′ - hydroxy-benzoyl)-benzofuran, 2,6 - bis(diethanolamino) - 4,8 - dipiperidinopyrimido [5,4-d]pyrimidine and N - 3′-phenyl-propyl-(2′)-1,1-diphenylpropyl-(3)-amine or adenosine.

The tablets are so formulated that the daily dose is 20 to 500 mg. of 3-isopropyl-5-(ortho-allyloxy-phenoxymethyl) - oxazolidinone-(2) and 5 to 50 mg. of pentaerythritol tetranitrate, advantageously with 3 daily administrations.

What is claimed is:
1. A compound of the formula

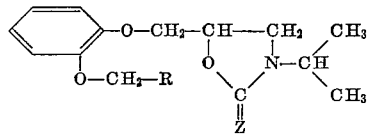

in which Z represents an oxygen or sulfur atom and R represents a lower alkenyl radical.

2. A compound as claimed in claim 1, that compound being of the formula

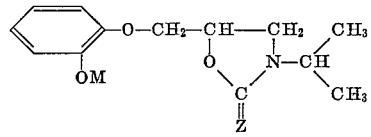

in which M stands for allyl or methallyl and Z has the meaning given in claim 1.

3. A compound as claimed in claim 1, that compound being 3 - isopropyl - 5 - (ortho-allyloxy-phenoxymethyl)-oxazolidinone-2 of the formula

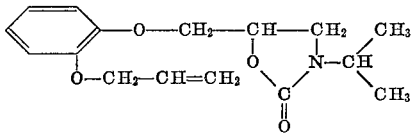

References Cited

FOREIGN PATENTS 834,968   5/1960   Great Britain.

ALTON D. ROLLINS, Primary Examiner

U.S. Cl. X.R.

424—14, 37, 251, 253, 272; 260—348, 570.7, 613